(12) United States Patent
Soriano et al.

(10) Patent No.: US 10,542,125 B2
(45) Date of Patent: Jan. 21, 2020

(54) SYSTEMS AND METHODS FOR CONFIGURING A COMPUTING DEVICE TO USE A COMMUNICATION PROTOCOL

(71) Applicant: THE BOEING COMPANY, Huntington Beach, CA (US)

(72) Inventors: Ignacio M. Soriano, St. Louis, MO (US); Ryan T. Greene, St. Peters, MO (US); Matthew David Burch, Chesterfield, MO (US)

(73) Assignee: THE BOEING COMPANY, Chicago, IL (US)

( * ) Notice: Subject to any disclaimer, the term of this patent is extended or adjusted under 35 U.S.C. 154(b) by 649 days.

(21) Appl. No.: 14/475,684

(22) Filed: Sep. 3, 2014

(65) Prior Publication Data

US 2016/0065697 A1   Mar. 3, 2016

(51) Int. Cl.
*H04L 29/06* (2006.01)
*H04L 29/08* (2006.01)

(52) U.S. Cl.
CPC .............. *H04L 69/18* (2013.01); *H04L 67/34* (2013.01)

(58) Field of Classification Search
CPC ... H04L 69/08; H04L 69/26; H04L 29/08072; H04L 29/08981; H04L 41/0806; H04L 41/12; H04L 67/34; H04L 69/18; H04L 29/06
USPC ................. 709/220, 228; 340/16.1; 710/104; 713/1, 100; 717/11
See application file for complete search history.

(56) References Cited

U.S. PATENT DOCUMENTS

| | | | |
|---|---|---|---|
| 4,228,496 A * | 10/1980 | Katzman | G06F 12/1458 710/100 |
| 4,538,224 A * | 8/1985 | Peterson | G06F 13/285 710/22 |
| 4,954,965 A | 9/1990 | Johnson et al. | |
| 6,005,856 A | 12/1999 | Jensen et al. | |
| 6,273,622 B1 | 8/2001 | Ben-David | |
| 6,330,005 B1 | 12/2001 | Tonelli et al. | |
| 6,373,854 B1 | 4/2002 | Lee | |
| 7,099,949 B1 * | 8/2006 | Vanhoof | H04B 1/707 375/E1.002 |
| 7,269,239 B2 | 9/2007 | Staver et al. | |
| 7,529,565 B2 | 5/2009 | Hilpisch et al. | |
| 7,590,137 B1 * | 9/2009 | Chan | G06F 13/385 370/419 |
| 8,214,532 B2 | 7/2012 | Caspers et al. | |
| 8,750,474 B2 | 6/2014 | Do et al. | |

(Continued)

*Primary Examiner* — Tonia L Dollinger
*Assistant Examiner* — Mehulkumar J Shah
(74) *Attorney, Agent, or Firm* — Armstrong Teasdale LLP

(57) ABSTRACT

A method for configuring a computing device to use a communication protocol is provided. The method is performed by a computing device that includes a host processor coupled to a bus processor and to memory. The method includes receiving, by the host processor, a human-readable configuration file that includes parameters for communication using the communication protocol. The method additionally includes generating, by the host processor, at least one data structure based on the parameters in the human-readable configuration file. Additionally, the method includes providing, to the bus processor, memory location associated with the at least one data structure for use in communicating using the communication protocol.

18 Claims, 4 Drawing Sheets

(56) References Cited

U.S. PATENT DOCUMENTS

| | | | | |
|---|---|---|---|---|
| 2001/0037443 | A1* | 11/2001 | Liu | G06F 9/3867 712/200 |
| 2003/0005104 | A1* | 1/2003 | Deboer | G06F 9/44505 709/223 |
| 2003/0233637 | A1* | 12/2003 | Martin | G06F 11/261 717/134 |
| 2007/0052809 | A1* | 3/2007 | Hammadou | H04N 7/185 348/211.3 |
| 2008/0140801 | A1* | 6/2008 | Holt | G06F 11/1482 709/215 |
| 2011/0150045 | A1* | 6/2011 | Thompson | H04B 1/28 375/147 |
| 2011/0153690 | A1* | 6/2011 | Allen | G06F 12/0269 707/816 |
| 2013/0347103 | A1* | 12/2013 | Veteikis | H04L 43/04 726/22 |
| 2016/0056906 | A1* | 2/2016 | Lassini | H04J 3/1694 370/442 |

* cited by examiner

SYSTEMS AND METHODS FOR CONFIGURING A COMPUTING DEVICE TO USE A COMMUNICATION PROTOCOL

BACKGROUND

The present disclosure relates generally to computer networking, and more specifically to configuring a computing device to use a communication protocol.

In known systems for enabling a computing device to communicate using a communication protocol, a computing device receives an Interface Control Document (ICD) that describes how often and what types of data are communicated among two or more computing devices using the communication protocol, and generates object code capable of managing communication pursuant to the interface control document. A developer of a software application links the generated object code to the software application, thereby enabling the software application to transmit and receive data using the communication protocol in accordance with the ICD. In many such systems, the object code is associated with a particular programming language, thereby making it difficult or impossible to link the object code to a software application developed in a different programming language. Moreover, changes to the software application may require the object code to be regenerated, as it is tightly coupled with the functionality of the software application. Additionally, given that the object code associated with managing communications is tightly coupled to the software application, a host processor that executes the software application is also burdened with managing the communications using the communication protocol in accordance with the ICD, rather than being able to offload such operations to a bus processor specifically designed for handling such operations.

Accordingly, it would be beneficial to enable a computing device to be configured to use a communication protocol in way that does not limit software applications to a particular programming language in order to use the communication protocol in accordance with an ICD, does not require regeneration of object code associated with communication protocol management functions each time a software application relying on such communications is changed, and does not burden a processor executing the software application with also managing low-level details of the communication protocol.

BRIEF DESCRIPTION

In one aspect, a method for configuring a computing device to use a communication protocol is provided. The method is performed by a computing device that includes a host processor coupled to a bus processor and to memory. The method includes receiving, by the host processor, a human-readable configuration file that includes parameters (e.g., details of an ICD) for communication using the communication protocol. The method additionally includes generating, by the host processor, at least one data structure based on the parameters in the human-readable configuration file. Additionally, the method includes providing, to the bus processor, memory location associated with at least one data structure for use in communicating using the communication protocol.

In another aspect, a computing device for use in communicating using a communication protocol is provided. The computing device includes a host processor coupled to a bus processor and to memory. The computing device is configured to receive, using the host processor, a human-readable configuration file that includes parameters for communication using the communication protocol. The computing device is additionally configured to generate, using the host processor, at least one data structure based on the parameters in the human-readable configuration file. Additionally, the computing device is configured to provide, to the bus processor, memory location associated with the at least one data structure for use in communicating using the communication protocol.

In another aspect, a computer-readable storage medium having computer-executable instructions embodied thereon for configuring a computing device to use a communication protocol is provided. When executed by a computing device having at least a host processor coupled to a bus processor and to memory, the computer-executable instructions cause the computing device to receive, using the host processor, a human-readable configuration file that includes parameters for communication using the communication protocol. The computer-executable instructions additionally cause the computing device to generate, using the host processor, at least one data structure based on the parameters in the human-readable configuration file. Additionally, the computer-executable instructions cause the computing device to provide, to the bus processor, memory location associated with the at least one data structure for use in communicating using the communication protocol.

DETAILED DESCRIPTION

Figure 1:
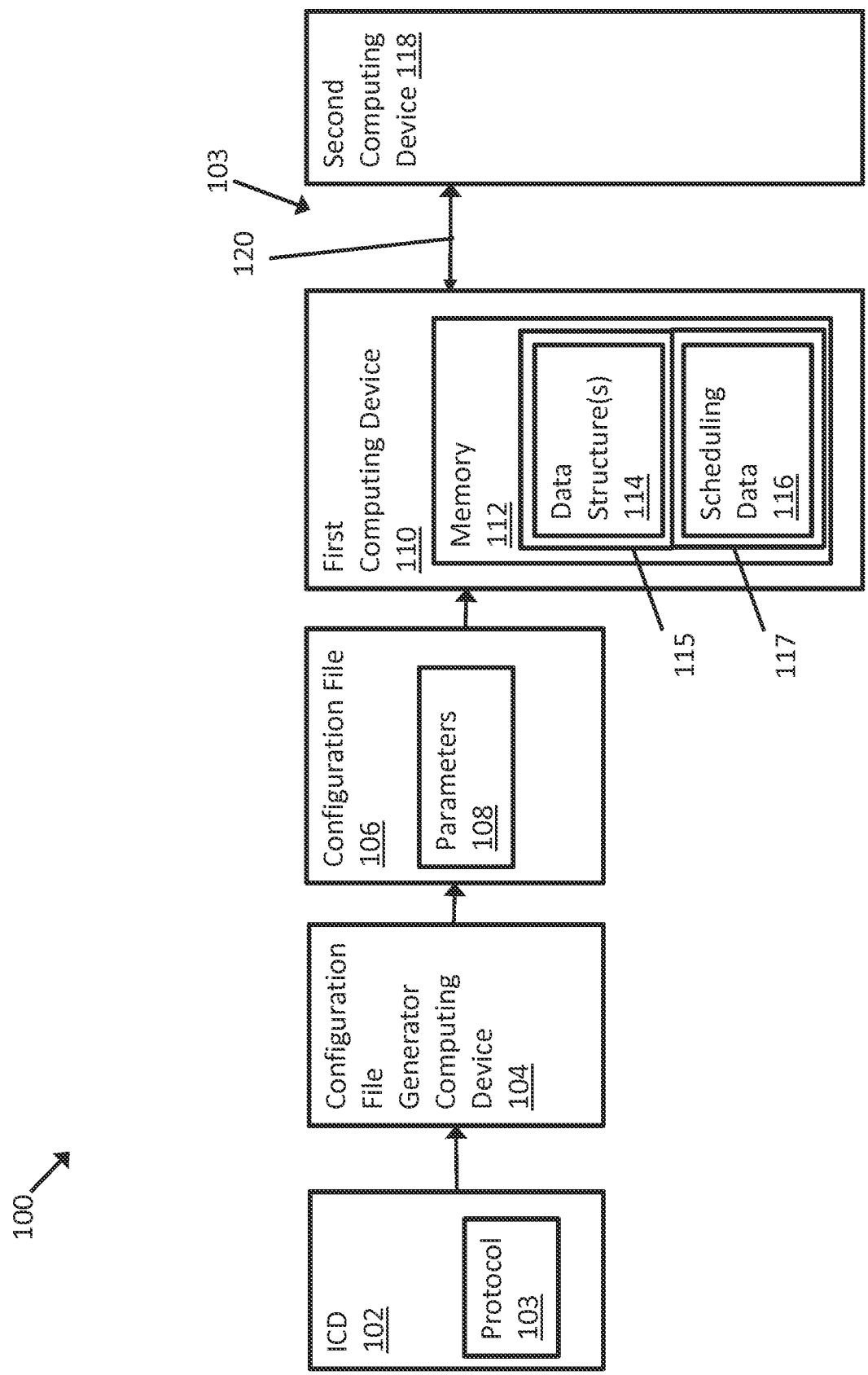
FIG. 1 is a diagram of an example environment in which a first computing device communicates with a second computing device using a communication protocol.

FIG. 1 is a diagram of an example environment 100 in which a first computing device 110 communicates with a second computing device 118 using a communication protocol 103. More specifically, prior to first computing device 110 communicating with second computing device 118 using communication protocol 103, a configuration file generator computing device 104 receives an interface control document (ICD) 102. Interface control document 102 pertains to protocol 103. More specifically, interface control document 102 defines how often and what types of data are communicated among two or more computing devices (e.g., first computing device 110 and second computing device 118) using protocol 103. In some implementations, protocol 103 is MUX, or military standard 1553 (MIL-STD-1553). In some implementations, protocol 103 is any other communication protocol, including a non-military communication protocol, such as Arinc-429, Ethernet, etc. Configuration file generator computing device 104 receives interface control document 102 and generates a configuration file 106 including parameters 108 that are based on interface control document 102. In some implementations, configuration file 106 is text-based and in a human-readable format. In some implementations, configuration file 106 encodes parameters 108 in an extensible markup language (XML), JavaScript Object Notation (JSON), or other markup language that is text-based and readable by a human. In such implementations, configuration file 106 may be parsed using a variety of different programming languages and/or hardware configurations, rather than being dependent on a single programming language and/or hardware configuration. In some implementations, two or more of configuration file generator computing device 104, first computing device 110, second computing device 118 are a separate processes executing on a single computing device. For example, in some implementations, two or more processes communicating over Ethernet on localhost 127.0.0.1 use configuration file 106 to construct message frames and packets.

First computing device 110 receives and parses configuration file 106. In parsing configuration file 106, first computing device 110 generates and stores one or more data structures 114 based on parameters 108 at a first location 115 in memory 112. Additionally, first computing device 110 generates and stores scheduling data 116 based on parameters 108 at a second location 117 in memory 112. For example, in some implementations, data structures 114 include a structure of a frame for use with communication protocol 103, including primitive data types (e.g., integer, character, Boolean, floating point) and their locations within the data structure 114. In some implementations, one or more data structures 114 define a structure of a payload of data to be transmitted to another computing device (e.g., second computing device 118), while other data structures 114 define a structure of header data for use in routing the payload to another computing device (e.g., second computing device 118). Scheduling data 116 pertains to timing and channel allocation for transmitting and receiving (collectively, communicating) messages 120 using protocol 103.

As described in more detail herein, first computing device 110 generates data structures 114 and scheduling data 116 in memory 112 using a host processor 305 (FIG. 3) during an initialization phase, and stores data structures 114 and scheduling data 116 in memory 112. A bus processor 326 accesses and uses data structures 114 and scheduling data 116 to communicate with second computing device 118 using protocol 103 during a runtime phase that occurs after the initialization phase. In some implementations, second computing device 118 also performs the operations described above to communicate using protocol 103.

Figure 2:
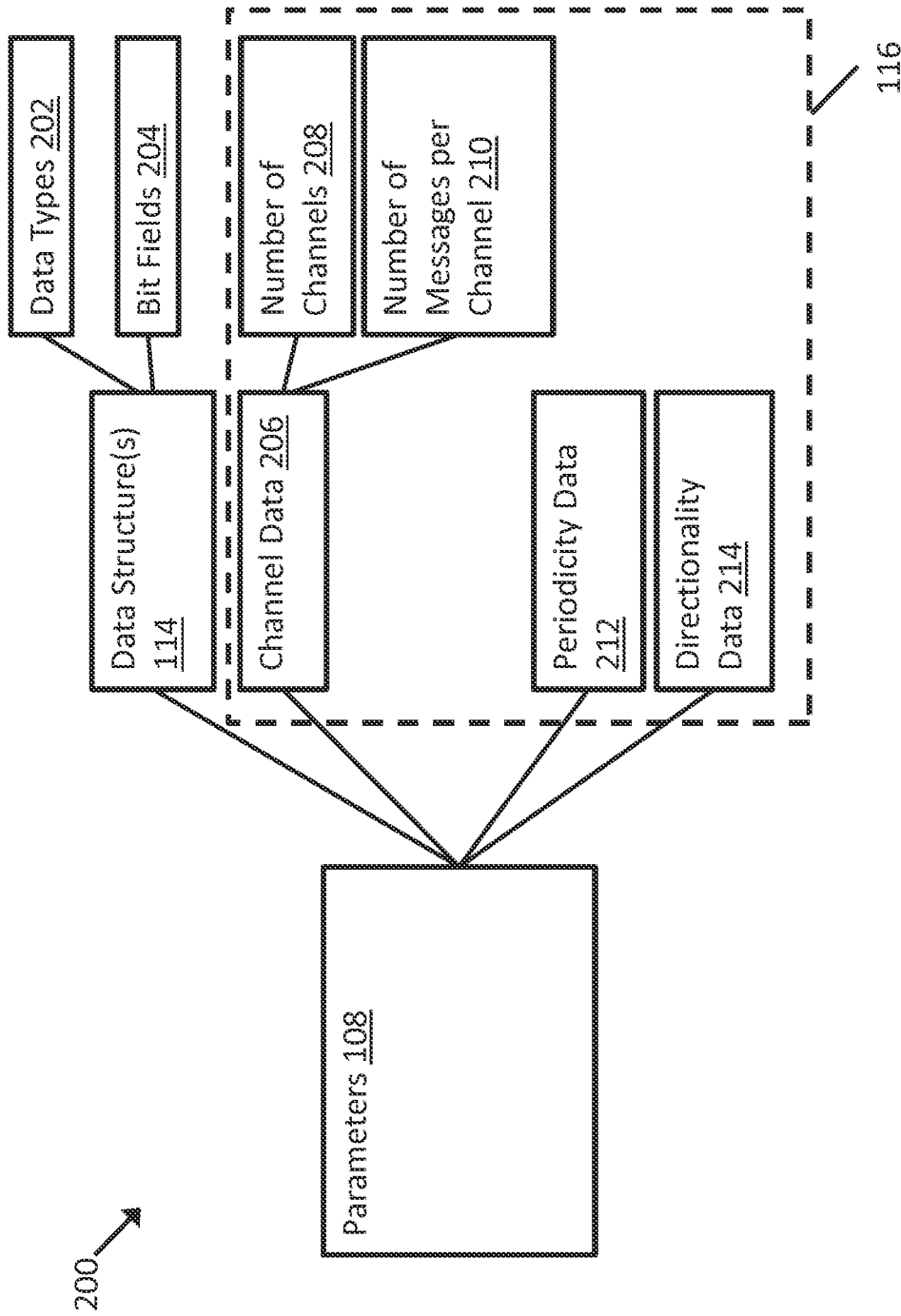
FIG. 2 is a diagram of a relationship between parameters defined in a configuration file associated with the communication protocol, data structures, and scheduling data.

FIG. 2 is a diagram of a relationship 200 between parameters 108 defined in configuration file 106, data structures 114, and scheduling data 218. More specifically, based on parameters 108, first computing device 110 generates data structures 114 and scheduling data 116 in memory 112. Data structures 114 include one or more data types 202 (e.g., integer, character, Boolean, floating point) and bit fields 204 that begin at a first memory location and end at a second memory location, or size, associated with each data structure 114. Scheduling data 116 includes channel data 206. Channel data 206 includes a number of channels 208 and a number of messages per channel 210. Additionally, scheduling data 116 includes periodicity data 212, which defines how often a particular type of message 120 is communicated (e.g., 1 Hz, 4 Hz, 20 Hz, or asynchronous). Scheduling data 116 additionally includes directionality data 214, which defines whether each message 120 is to be received at first computing device 110 or transmitted from first computing device 110.

Figure 3:
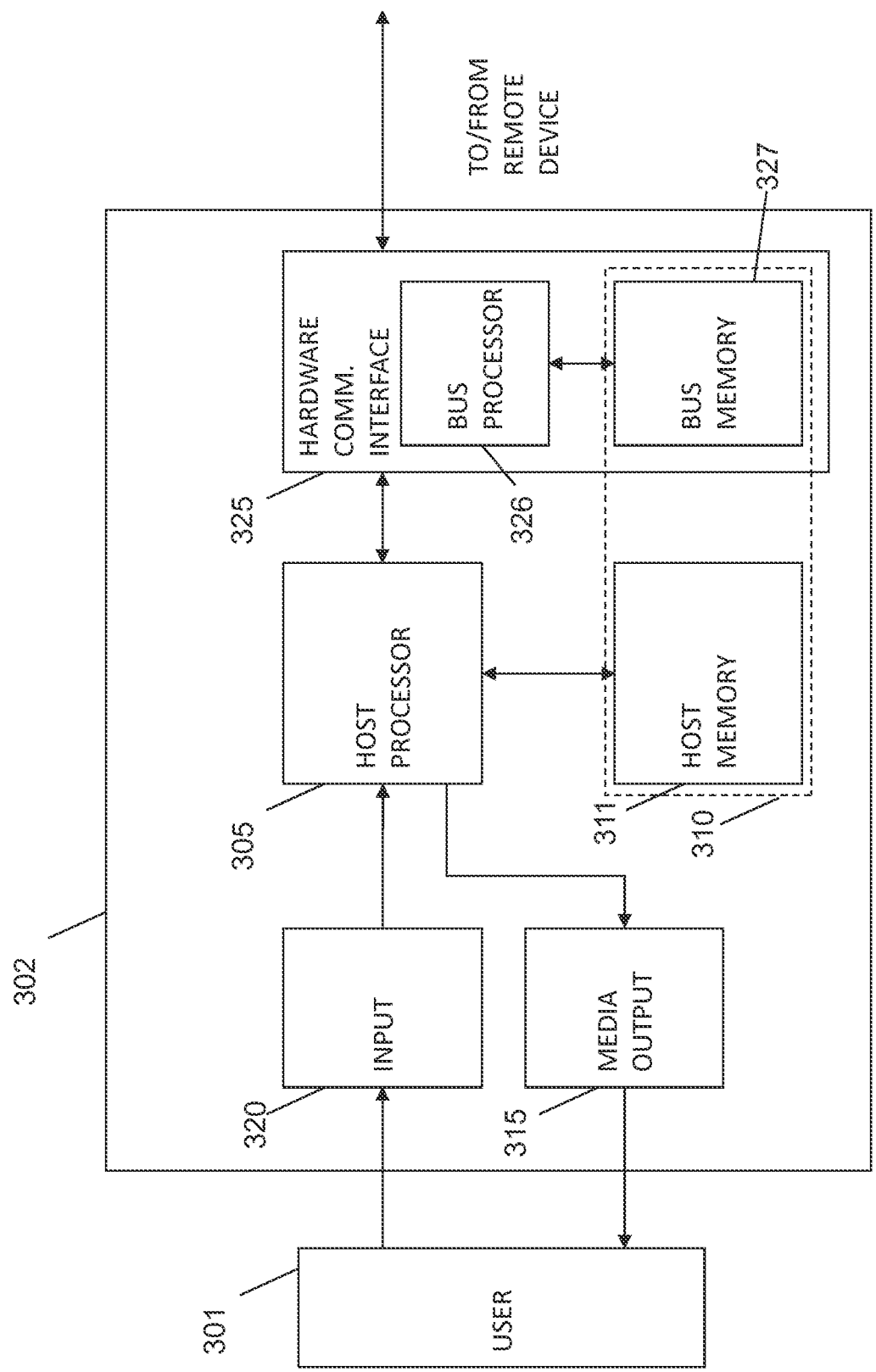
FIG. 3 is a block diagram of an example computing device.

FIG. 3 is a block diagram of an example computing device 302. Computing device 302 is representative of first computing device 110. Additionally, in at least some implementations, second computing device 118 and configuration file generator computing device include one or more components of computing device 302. Computing device 302 includes one or more host processors 305 for executing instructions. In some implementations, executable instructions are stored in a memory device 310. Host processor 305 may include one or more processing units (e.g., in a multi-core configuration). One or more memory devices 310 are any one or more devices allowing information such as executable instructions and/or other data to be stored and retrieved. One or more memory devices 310 may include one or more computer-readable media.

Computing device 302 also includes at least one media output component 315 for presenting information to an agent 301. Media output component 315 is any component capable of conveying information to agent 301. In some implementations, media output component 315 includes an output adapter such as a video adapter and/or an audio adapter. An output adapter is operatively coupled to host processor 305 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some implementations, computing device 302 includes an input device 320 for receiving input from agent 301. Input device 320 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 315 and input device 320. In some implementations, computing device 302 additionally or alternatively receives input from at least one other source.

Computing device 302 additionally includes a hardware communication interface 325, which is communicatively couplable to a remote device such as second computing device 118. Hardware communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)). In some implementations, communication interface 325 is configured to communicate using MIL-STD-1553.

In some implementations, memory device 310 is partitioned into a host memory 311 that is coupled to host processor 305 and a bus memory 327 coupled to a bus processor 326 included in hardware communication interface 325. As described above, in some implementations, during an initialization phase, host processor 305 receives and parses configuration file 106, and generates data structures 114 and scheduling data 116 based on parameters 108 in configuration file 106. Host processor 305 stores data structures 114 and scheduling data 116 in memory device 310 (i.e., memory 112 in FIG. 1). In some implementations, during the initialization phase, host processor 305 and bus processor 326 perform a handshaking process in which memory pairs are established in host memory 311 and bus memory 327, such that any data stored in one of the paired memory locations in host memory 311 is buffered in a corresponding memory location in bus memory 327. In other implementations, host processor 305 and bus processor 326 utilize shared memory. Accordingly, in such implementations, computing device 302 stores one or more of data structures 114 and scheduling data 116 in both host memory 311 and bus memory 327 during the initialization phase. Bus processor 326 accesses and uses data structures 114 and scheduling data 116 to communicate with second computing device 118 using protocol 103 during a runtime phase that occurs after the initialization phase.

Stored in one or more memory devices 310 are, for example, computer-readable instructions for providing a user interface to agent 301 via media output component 315 and, optionally, receiving and processing input from input device 320. A user interface may include, text, graphics, and/or sound that enable agent 301 to interact with computing device 302, for example to control operations of computing device 302 and/or view output based, for example, on messages 120 communicated from first computing device 110 to another computing device (e.g., second computing device 118) and/or vice versa. More specifically, host processor 305 accesses computer-executable instructions in host memory 310 and executes a software application that relies on communication of messages 120 using protocol 103, but does not directly manage scheduling or packing and unpacking of messages 120 communicated using protocol 103. Rather, bus processor 326 manages such operations based on data structures 114 and scheduling data 116 stored in memory device 310 (e.g., memory 112 in FIG. 1). Accordingly, host processor 305 is freed of the burden of managing the low level communication operations. Applications executed by host processor 305 retrieve data from and store data in data structures 114, for example using templates that provide a layer of abstraction between low-level details of data structures 114 (e.g., bit fields 204) and higher-level operations that utilize data stored in data structures 114.

Figure 4:
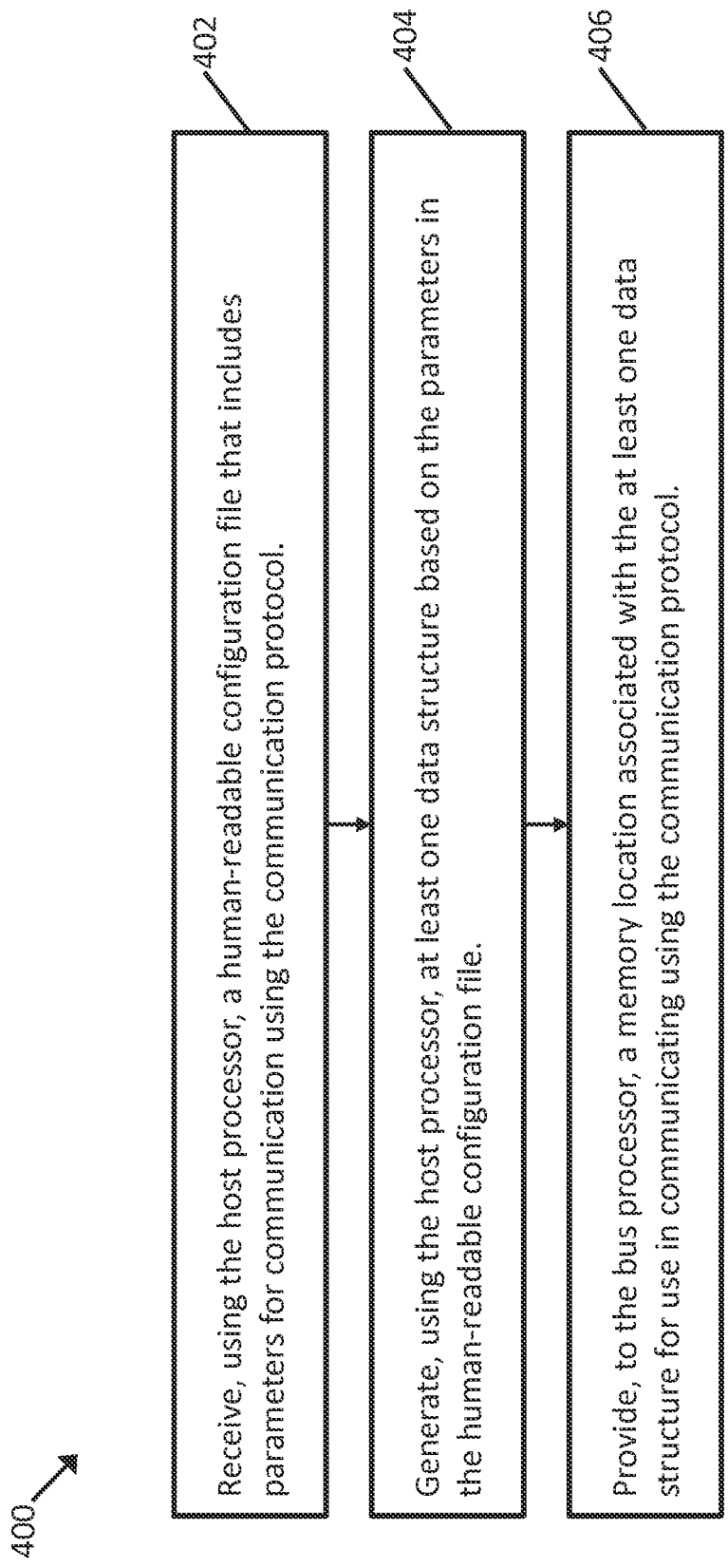
FIG. 4 is a flow chart of a process that may be performed by the first computing device for configuring the first computing device to use the communication protocol.

FIG. 4 is a flow chart of a process 400 that may be performed by first computing device 110 for configuring first computing device 110 to use communication protocol 103. Initially, first computing device 110 receives 402, using host processor 305, a human-readable configuration file 106 that includes parameters 108 for communication using communication protocol 103. Additionally, first computing device 110 generates 404, using host processor 305, at least one data structure 114 based on parameters 108 in human-readable configuration file 106. Additionally, first computing device 110 provides 406, to bus processor 326, memory location 115 associated with the at least one data structure 114 for use in communicating using communication protocol 103.

In some implementations, first computing device 110 generates, using host processor 305, scheduling data 116 based on parameters 108 in human-readable configuration file 106 and transmits, using host processor 305, scheduling data 116 to bus processor 326 for use in communicating using communication protocol 103. In some implementations, first computing device 110 generates, using host processor 305, directionality data 214 based on parameters 108 in human-readable configuration file 106 and transmits, using host processor 305, directionality data 214 to bus processor 326 for use in communicating using communication protocol 103. In some implementations, first computing device 110 generates, using host processor 305, channel data 206 that specifies at least a number of channels 208 and a number of messages per channel 210, and transmits, using host processor 305, channel data 206 to bus processor 326 for use in communicating using communication protocol 103. In some implementations, first computing device 110 generates, using host processor 305, periodicity data 212 based on parameters 108 in human-readable configuration file 106 and transmits, using host processor 305, periodicity data 212 to bus processor 326 for use in communicating using communication protocol 103. In some implementations, host processor 305 transmits data (e.g., scheduling data 116, channel data 206, periodicity data 212, and/or directionality data 214) to bus processor 326 by transmitting memory location (e.g., pointer) 117 associated with the data to bus processor 326.

In some implementations, first computing device 110 stores, using host processor 305, data within at least one data structure 114 at memory location 115 associated with data structure 114, accesses, using bus processor 326, the data at memory location 115 associated with data structure 114, and transmits, using bus processor 326, the data to second computing device 118 using communication protocol 103.

In some implementations, first computing device 110 includes a first memory portion associated with host processor 305 (e.g., host memory 311) and a second memory portion associated with bus processor 326 (e.g., bus memory 327) and is configured to store data in data structure 114 in the first memory portion (e.g., host memory 311), buffer the data in the second memory portion (e.g., bus memory portion 327), and transmit, using bus processor 326, the data from the second memory portion (e.g., bus memory portion 327) to second computing device 118 using communication protocol 103.

In some implementations, first computing device 110 receives, using bus processor 326, data from second computing device 118 using communication protocol 103, stores, using bus processor 326, the data in memory 112 at memory location 115, and accesses, using host processor 305, the data using data structure 114. In some implementations, first computing device 110 generates a data structure representing a structure of a frame (i.e., MUX 1553 frame, Ethernet frame, or other, depending on the implementation) for use with communication protocol 103. In some implementations, protocol 103 is a MIL-STD-1553, or MUX 1553, communication protocol. As described above, in some implementations, protocol 103 is a different protocol than MIL-STD-1553 or MUX 1553.

A technical effect of systems and methods described herein includes at least one of: (a) receiving, by a host processor, a human-readable configuration file that includes parameters for communication using a communication protocol; (b) generating, by the host processor, at least one data structure based on the parameters in the human-readable configuration file; (c) providing, to a bus processor, memory location associated with the at least one data structure for use in communicating (e.g., transmitting and/or receiving messages) using the communication protocol.

As compared to known methods and systems for enabling a computing device to communicate using a communication protocol, the methods and systems described herein enable a computing device to be configured with a configuration file rather than object code tied to a particular programming language. Stated differently, the methods and systems described herein enable the construction of a system that can use a metadata description of a communication topology to configure an application/implementation of a communication engine (written in any language) to establish a communication link between two devices or processes. Accordingly, software developers are able to use different programming languages to implement software applications that rely on the communication protocol and to make changes to the software applications without the need to change and recompile code pertaining to low-level details of the communication protocol. Additionally, the methods and systems described herein enable more efficient execution of the software applications by a host processor by offloading communication protocol management functions from the host processor to a bus processor.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated. This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for configuring a computing device to use a communication protocol, the method is performed by the computing device including a host processor coupled a host memory, wherein the host processor is also coupled to a bus processor which is coupled to a bus memory, the method comprising:
   during an initialization phase of the computing device, receiving, by the host processor, a human-readable configuration file that includes parameters for communication using the communication protocol;
   during the initialization phase, generating, by the host processor, at least one data structure representing a frame for use with the communication protocol based on the parameters in the human-readable configuration file;
   during the initialization phase, storing, in the host memory and the bus memory, the at least one data structure for use in communicating using the communication protocol during a subsequent runtime phase of the computing device;
   during the initialization phase, linking a host memory location associated with the at least one data structure stored in the host memory and a bus memory location associated with the at least one data structure stored in the bus memory, wherein data stored at the host memory location is buffered at the bus memory location;
   during the subsequent runtime phase, storing, in the host memory, data for transmission via the communication protocol;
   during the subsequent runtime phase, retrieving, from the bus memory, the data and generating, by the bus processor, the frame for use with the communication protocol using the data; and
   during the subsequent runtime phase, transmitting, by the bus processor, the frame via the communication protocol.

2. The method of claim 1, further comprising:
   generating, by the host processor, scheduling data based on the parameters in the human-readable configuration file; and
   transmitting, by the host processor, the scheduling data to the bus processor for use in communicating using the communication protocol.

3. The method of claim 1, further comprising:
   generating, by the host processor, directionality data based on the parameters in the human-readable configuration file; and
   transmitting, by the host processor, the directionality data to the bus processor for use in communicating using the communication protocol.

4. The method of claim 1, further comprising:
   generating, by the host processor, channel data that specifies at least a number of channels and a number of messages per channel, based on the parameters in the human-readable configuration file; and
   transmitting, by the host processor, the channel data to the bus processor for use in communicating using the communication protocol.

5. The method of claim 1, wherein the computing device is a first computing device, said method further comprising:
   during the subsequent runtime phase, storing, by the host processor, data within the data structure at the host memory location;
   during the subsequent runtime phase, accessing, by the bus processor, the data at the bus memory location; and
   during the subsequent runtime phase, transmitting, by the bus processor, the data to a second computing device using the communication protocol.

6. The method of claim 1, wherein the computing device includes a memory device which includes the host memory associated with the host processor and the bus memory associated with the bus processor, and the computing device is a first computing device, said method further comprising:
   during the subsequent runtime phase, storing data in the data structure in the host memory;
   during the subsequent runtime phase, buffering the data in the bus memory; and
   during the subsequent runtime phase, transmitting, by the bus processor, the data from the bus memory to a second computing device using the communication protocol.

7. The method of claim 1, wherein the computing device is a first computing device, said method further comprising:
   receiving, by the bus processor, data from a second computing device using the communication protocol;
   storing, by the bus processor, the data in the bus memory at the bus memory location; and
   accessing, by the host processor, the data using the data structure.

8. The method of claim 1, wherein generating at least one data structure further comprises generating a data structure representing a frame for use with a MIL-STD-1553 communication protocol.

9. A computing device for use in communicating using a communication protocol, said computing device comprising a host processor coupled a host memory, wherein said host processor is also coupled to a bus processor which is coupled to a bus memory, said computing device configured to:
   during an initialization phase of said computing device, receive, using said host processor, a human-readable configuration file that includes parameters for communication using the communication protocol;

during the initialization phase, generate, using said host processor, at least one data structure representing a frame for use with the communication protocol based on the parameters in the human-readable configuration file;

during the initialization phase, store, in said host memory and said bus memory, at least one data structure for use in communicating using the communication protocol during a subsequent runtime phase of said computing device;

during the initialization phase, link a host memory location associated with the at least one data structure stored in said host memory and a bus memory location associated with the at least one data structure stored in said host memory, wherein data stored at said host memory location is buffered at said bus memory location;

during the subsequent runtime phase, store, in said host memory, data for transmission via the communication protocol;

during the subsequent runtime phase, retrieve, from said bus memory, the data and generate, by said bus processor, the frame for use with the communication protocol using the data; and during the subsequent runtime phase, transmit, by said bus processor, the frame via the communication protocol.

10. The computing device of claim 9, further configured to:

generate, using said host processor, scheduling data based on the parameters in the human-readable configuration file; and transmit, using said host processor, the scheduling data to said bus processor for use in communicating using the communication protocol.

11. The computing device of claim 9, further configured to:

generate, using said host processor, directionality data based on the parameters in the human-readable configuration file; and transmit, using said host processor, the directionality data to said bus processor for use in communicating using the communication protocol.

12. The computing device of claim 9, further configured to:

generate, using said host processor, channel data that specifies at least a number of channels and a number of messages per channel, based on the parameters in the human-readable configuration file; and transmit, using said host processor, the channel data to said bus processor for use in communicating using the communication protocol.

13. The computing device of claim 9, wherein said computing device is a first computing device, said first computing device further configured to:

during the subsequent runtime phase, store, using said host processor, data within the data structure at the host memory location;

during the subsequent runtime phase, access, using said bus processor, the data at the bus memory location; and during the subsequent runtime phase, transmit, using said bus processor, the data to a second computing device using the communication protocol.

14. The computing device of claim 9, wherein said computing device includes a memory device which includes said host memory associated with said host processor and said bus memory associated with said bus processor, and said computing device is a first computing device, said first computing device further configured to:

during the subsequent runtime phase, store data in the data structure in said host memory;

during the subsequent runtime phase, buffer the data in said bus memory; and during the subsequent runtime phase, transmit, using said bus processor, the data from said bus memory to a second computing device using the communication protocol.

15. The computing device of claim 9, wherein said computing device is a first computing device, said first computing device further configured to:

receive, using said bus processor, data from a second computing device using the communication protocol;

store, using said bus processor, the data in said bus memory at the bus memory location; and access, using said host processor, the data using the data structure.

16. The computing device of claim 9, further configured to generate the at least one data structure by generating at least a data structure representing a frame for use with a MIL-STD-1553 communication protocol.

17. A non-transitory computer-readable storage medium having computer-executable instructions embodied thereon for configuring a computing device to use a communication protocol, wherein when executed by a computing device having at least a host processor coupled to a bus processor and to memory, the computer-executable instructions cause the computing device to:

during a first initialization phase of the computing device, receive, using the host processor, a first human-readable configuration file that includes parameters for communication using a first communication protocol;

during the first initialization phase, generate, using the host processor, at least one data structure representing a first frame for use with the first communication protocol based on the parameters in the first human-readable configuration file;

during the first initialization phase, provide, to the bus processor, a memory location associated with the at least one data structure for use in communicating using the first communication protocol during a subsequent runtime phase of the computing device;

during the first initialization phase, linking a host memory location associated with the at least one data structure stored in the host memory and a bus memory location associated with the at least one data structure stored in the bus memory, wherein data stored at the host memory location is buffered at the bus memory location;

during the subsequent runtime phase, storing, in the host memory, data for transmission via the first communication protocol;

during the subsequent runtime phase, generate, by the bus processor, the first frame for use with the first communication protocol;

during the subsequent runtime phase, transmit, by the bus processor, the first frame via the first communication protocol, during a second initialization phase of the computing device, receive, using the host processor, a second human-readable configuration file that includes parameters for communication using a second communication protocol, wherein the first communication protocol is different from the second communication protocol;

during the second initialization phase, generate, using the host processor, at least one data structure representing a second frame for use with the second communication protocol based on the parameters in the second human-readable configuration file; and during the second initialization phase, provide, to the bus processor, a memory location associated with the at least one data structure for use in communicating using the second communication protocol during a subsequent runtime phase of the computing device.

18. The non-transitory computer-readable storage medium of claim 17, wherein said computer-executable instructions additionally cause the computing device to:

generate, using the host processor, scheduling data, directionality data, and channel data based on the parameters in the first human-readable configuration file; and transmit, using the host processor, the scheduling data, directionality data, and channel data to the bus processor for use in communicating using the first communication protocol.

* * * * *